United States Patent
Shiu et al.

(10) Patent No.: US 9,912,224 B2
(45) Date of Patent: Mar. 6, 2018

(54) POWER SUPPLY SYSTEM AND SHORT CIRCUIT AND/OR BAD CONNECTION DETECTION METHOD THEREOF, AND POWER CONVERTER THEREOF

(71) Applicants: Yi-Min Shiu, Hsinchu (TW); Isaac Y. Chen, Zhubei (TW)

(72) Inventors: Yi-Min Shiu, Hsinchu (TW); Isaac Y. Chen, Zhubei (TW)

(73) Assignee: RICHTEK TECHNOLOGY CORPORATION, Chupei, Hsinchu (TW)

( * ) Notice: Subject to any disclaimer, the term of this patent is extended or adjusted under 35 U.S.C. 154(b) by 208 days.

(21) Appl. No.: 14/735,187

(22) Filed: Jun. 10, 2015

(65) Prior Publication Data

US 2015/0372601 A1    Dec. 24, 2015

Related U.S. Application Data

(60) Provisional application No. 62/014,305, filed on Jun. 19, 2014.

(51) Int. Cl.

| | |
|---|---|
| *H02M 1/32* | (2007.01) |
| *H02M 3/156* | (2006.01) |
| *H02M 7/217* | (2006.01) |
| *H02H 7/10* | (2006.01) |
| *H02M 3/335* | (2006.01) |
| *H02M 1/00* | (2006.01) |

(52) U.S. Cl.
CPC ............ *H02M 1/32* (2013.01); *H02M 3/156* (2013.01); *H02M 7/217* (2013.01); *H02H 7/10* (2013.01); *H02M 3/33523* (2013.01); *H02M 2001/0012* (2013.01); *H02M 2001/0025* (2013.01)

(58) Field of Classification Search
CPC .. H02M 1/32; H02M 2001/0025; H02M 1/36; H02M 3/156; H02M 2001/0012; H02H 7/10
See application file for complete search history.

(56) References Cited

U.S. PATENT DOCUMENTS

| | | | |
|---|---|---|---|
| 6,297,661 B1 * | 10/2001 | Chen | G01R 19/16528 324/762.01 |
| 8,339,760 B2 | 12/2012 | Rabu et al. | |
| 8,498,087 B2 | 7/2013 | Rabu et al. | |
| 8,643,993 B2 | 2/2014 | Tsai et al. | |
| 2011/0002068 A1 * | 1/2011 | Hu | H02M 1/32 361/18 |

(Continued)

*Primary Examiner* — Fred E Finch, III
*Assistant Examiner* — Rafael O De Leon Domenech
(74) *Attorney, Agent, or Firm* — Tung & Associates

(57) ABSTRACT

The present invention discloses a short circuit and/or bad connection detection method for use in a power supply system. The power supply system includes a power converter which converts an input voltage to an output voltage and supplies an output current to an electronic device. In the short circuit detection method, the conversion from the input voltage to the output voltage is disabled in a disable time period, and whether a short circuit occurs is determined according to the decreasing speed of the output voltage. In the bad connection detection method, an actual voltage and an actual current received by the electronic device are compared with the output voltage and the output current, to determine whether a bad connection occurs.

12 Claims, 8 Drawing Sheets

(56) References Cited

U.S. PATENT DOCUMENTS

2013/0342938 A1   12/2013  Eom et al.
2015/0326008 A1*  11/2015  Baurle .................... H02H 7/10
                                                    361/87

* cited by examiner

POWER SUPPLY SYSTEM AND SHORT CIRCUIT AND/OR BAD CONNECTION DETECTION METHOD THEREOF, AND POWER CONVERTER THEREOF

CROSS REFERENCE

The present invention claims priority to U.S. 62/014,305, filed on Jun. 19, 2014.

BACKGROUND OF THE INVENTION

Field of Invention

The present invention relates to a power supply system capable of performing a short circuit detection and a bad connection detection; particularly, it relates to such a power supply system capable of detecting abnormal but not severe conditions which lead to undesirable power loss, such as weakly short circuit and weakly bad connection conditions, and a detection method and a power converter thereof.

Description of Related Art

Please refer to FIGS. 1A and 1B. FIG. 1A shows a block diagram of a conventional power supply system. FIG. 1B explains how an abnormal but not severe condition occurs in the prior art of FIG. 1A which leads to power loss. The conventional power supply system 10 comprises a power converter 11, a cable 12 and an electronic device 13. A port 112 of the power converter 11 is connected to a port 121 of the cable 12. A port 132 of the electronic device 13 is connected to another port 122 of the cable 12. When the power converter 11, the cable 12 and the electronic device 13 are connected in serial, power lines 17 and 18 form a loop to deliver the power. The cable 12 further includes a signal line 14, for data transmission between the power converter 11 and the electronic device 13. The signal line 14 can be, for example but not limited to, a differential signal line.

As shown in FIG. 1B, when an unwanted material such as dust, dirt, thread, etc. falls on or in the ports 112, 121, 122 and/or 132, the power lines 17 and 18 may be "weakly short-circuited"—i.e., a short-cut current path is formed between the power lines 17 and 18, but the electrical connection is weak, so there is not a huge amount of current flowing through this short-cut current path. Such "weakly short circuit" is illustrated by the resistors R11, R121, R122 and R13 in the figure. Although there is not a huge amount of current flowing through the short-cut current path, this abnormal condition still leads to power loss, and if this abnormal condition is not well controlled, it can be very dangerous.

Besides, if the power lines 17 and 18 does not have a good quality, or a bad connection occurs between the ports, even though the bad connection is not so severe to cause an open-circuit, this abnormal condition will also lead to power loss. The bad connection is illustrated by the resistors R1', R2', R3' and R4' in the figure.

Because the "weakly short circuit" and "bad connection" usually do not lead to fully short-circuit or complete open-circuit, the prior art did not propose an effective solution to address this issue.

The prior art U.S. Pat. No. 8,498,087 and U.S. Pat. No. 8,339,760 provide an approach to solve the above-mentioned problem by detecting whether there is abnormal temperature increase in the cable. However, to do so, an additional heat detection signal line is required, which is not compatible to the current standard cable, and also leads to a higher manufacturing cost. Moreover, before an abnormal temperature increase becomes detectable, unwanted power loss and other problems have already happened for a long time. Therefore, the above-mentioned prior art patents do not practically solve the problem.

In view of the above, to overcome the drawbacks in the prior art, the present invention proposes a power supply system capable of detecting an abnormal condition such as a weakly short circuit and a bad connection, which leads to undesirable power loss.

SUMMARY OF THE INVENTION

From one perspective, the present invention provides a power converter for converting an input voltage to an output voltage, wherein the output voltage is to be supplied to an electronic device through a cable; the power converter comprising: a switch; a switch control unit for controlling the switch, to perform the conversion from the input voltage to the output voltage; and a short circuit detection unit, including: a timer circuit for generating a temporary stop signal, to temporarily disable the switch control unit for a disable time period; and an abnormal voltage drop detection circuit for determining whether or not a short circuit occurs during the disable time period according to a decreasing speed of the output voltage.

In one embodiment, the abnormal voltage drop detection circuit includes: a voltage comparison circuit for determining whether or not the short circuit occurs according to a comparison result between the output voltage and a reference voltage.

In one embodiment, the reference voltage is adjustable.

In one embodiment, when the power converter is coupled to the electronic device through the cable, the reference voltage is set to a relatively lower level; and when the power converter is not coupled to the electronic device through the cable, the reference voltage is set to a relatively higher level.

In one embodiment, the power converter includes an isolated type AC-DC converter, and the isolated type AC-DC converter transmits a feedback signal related to the output voltage to the switch control unit via a feedback circuit, wherein the temporary stop signal disables the switch control unit by turning off the feedback circuit.

In one embodiment, the timer circuit generates the temporary stop signal by one or a combination of two or more of the following approaches: generating the temporary stop signal STOP during or immediately after a start-up operation; generating the temporary stop signal STOP during or immediately after a power-on-reset operation; generating the temporary stop signal STOP periodically; or generating the temporary stop signal STOP irregularly.

From another perspective, the present invention provides a short circuit detection method of a power supply system, wherein the power supply system includes a power converter for converting an input voltage to an output voltage to be supplied to an electronic device through a cable; the short circuit detection method of the power supply system comprising the steps of: stopping converting the input voltage to the output voltage for a disable time period; and determining whether or not a short circuit occurs according to a decreasing speed of the output voltage.

From another perspective, the present invention provides a power supply system, comprising: a power converter for converting an input voltage to an output voltage and supplying an output current, wherein the output voltage and the output current are supplied to an electronic device through a cable; and a bad connection detection unit, including: a voltage sensing circuit for sensing an actual voltage received by the electronic device; a current sensing circuit for sensing an actual current received by the electronic device; a first analog-to-digital converter for converting the actual voltage to a first digital signal; a second analog-to-digital converter for converting the actual current to a second digital signal; and a calculation circuit for determining whether or not a bad connection occurs according to the first digital signal, the second digital signal, the output voltage and the output current.

In one embodiment, the calculation circuit compares the first digital signal with a desired level of the output voltage and compares the second digital signal with a desired level of the output current, to determine whether or not the bad connection occurs.

In one embodiment, the calculation circuit compares the first digital signal with a digital signal of the output voltage converted from a sensed value of the output voltage and compares the second digital signal with a digital signal of the output current converted from a sensed value of the output current, to determine whether or not the bad connection occurs.

In one embodiment, the bad connection detection unit is located inside the electronic device.

In one embodiment, the bad connection detection unit has a first part inside the electronic device and a second part inside the power converter, and the first and second parts of the bad connection detection unit communicate through a signal line of the cable.

From another perspective, the present invention provides a bad connection detection method of a power supply system, wherein the power supply system includes a power converter for converting an input voltage to an output voltage and supplying an output current, the output voltage and the output current being supplied to an electronic device through a cable, the bad connection detection method of the power supply system comprising the steps of: sensing a actual voltage and an actual current received by the electronic device and converting the actual voltage and the actual current to an actual voltage digital signal and an actual current digital signal, respectively; comparing the actual voltage digital signal and the actual current digital signal with a desired level of the output voltage and a desired level of the output current, respectively; and when a difference between the actual voltage digital signal and the desired level of the output voltage exceeds a first predetermined threshold difference, and/or when a difference between the actual current digital signal and the desired level of the output current exceeds a second predetermined threshold difference, determining that a bad connection occurs.

From another perspective, the present invention provides a bad connection detection method of a power supply system, wherein the power supply system includes a power converter for converting an input voltage to an output voltage and supplying an output current, the output voltage and the output current being supplied to an electronic device through a cable, the bad connection detection method of the power supply system comprising the steps of: sensing a actual voltage and an actual current received by the electronic device and converting the actual voltage and the actual current to an actual voltage digital signal and an actual current digital signal, respectively; sensing the output voltage and the output current and converting the output voltage and the output current to an output voltage digital signal and an output current digital signal, respectively; comparing the actual voltage digital signal and the actual current digital signal with the output voltage digital signal and the output current digital signal, respectively; and when a difference between the actual voltage digital signal and the output voltage digital signal exceeds a first predetermined threshold difference, and/or when a difference between the actual current digital signal and the output current digital signal exceeds a second predetermined threshold difference, determining that a bad connection occurs.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the components and devices, but not drawn according to actual scale.

Figure 1A:
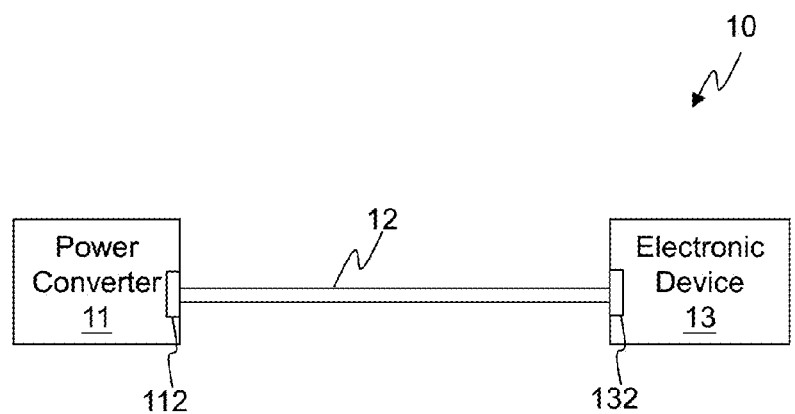
FIG. 1A shows a block diagram of a conventional power supply system.
Figure 1B:
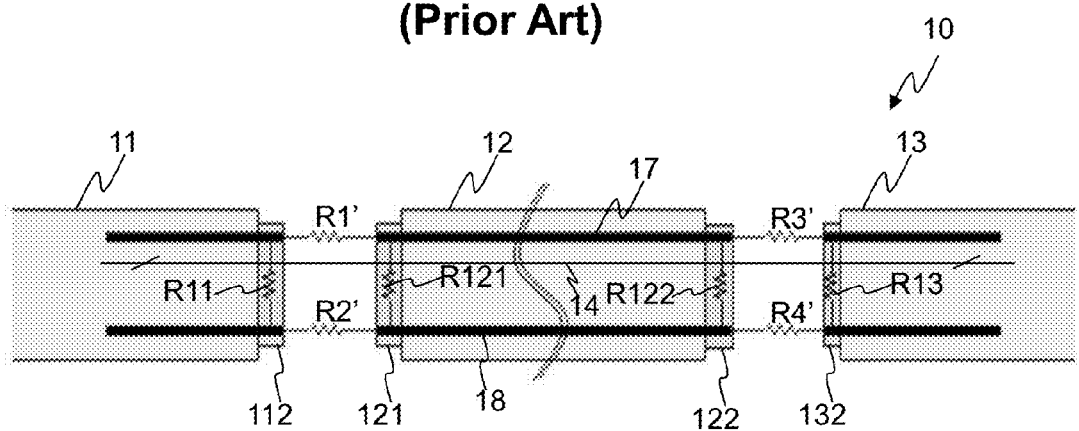
FIG. 1B explains how an abnormal condition occurs in the prior art of FIG. 1A which leads to power loss.
Figure 2A:
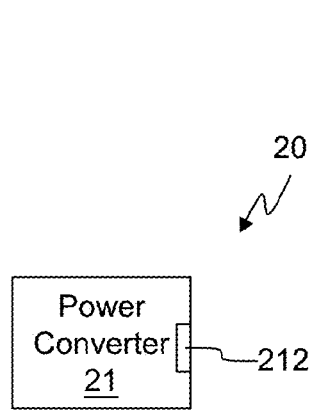
FIGS. 2A-2B show a block diagram of a power supply system according to a first embodiment of the present invention.
Figure 2B:
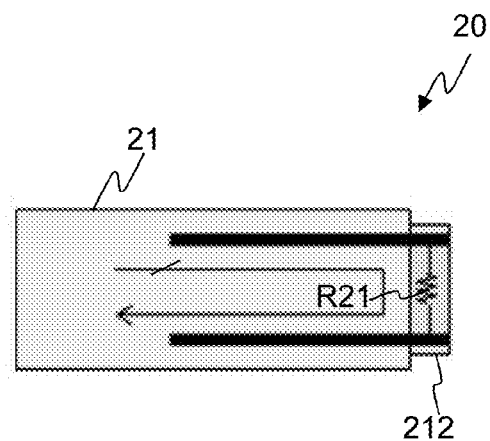
Figure 2C:
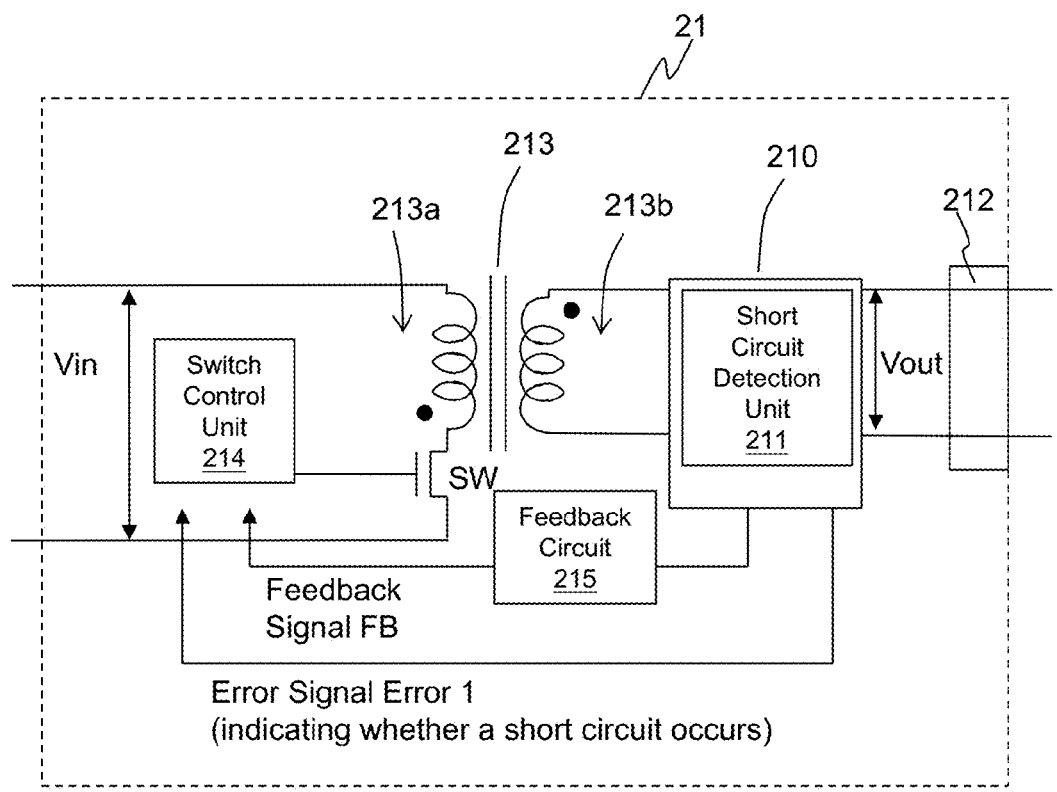
FIG. 2C shows an embodiment of a power converter.
Figure 3A:
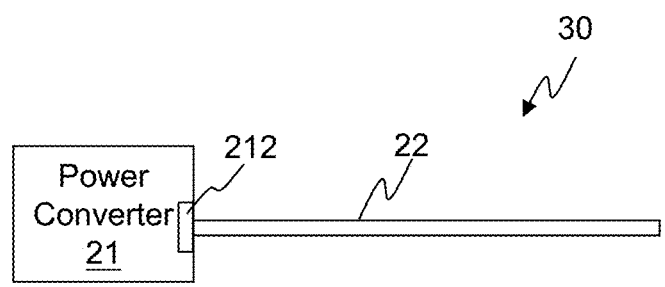
FIGS. 3A-3B show a block diagram of a power supply system according to a second embodiment of the present invention.
Figure 3B:
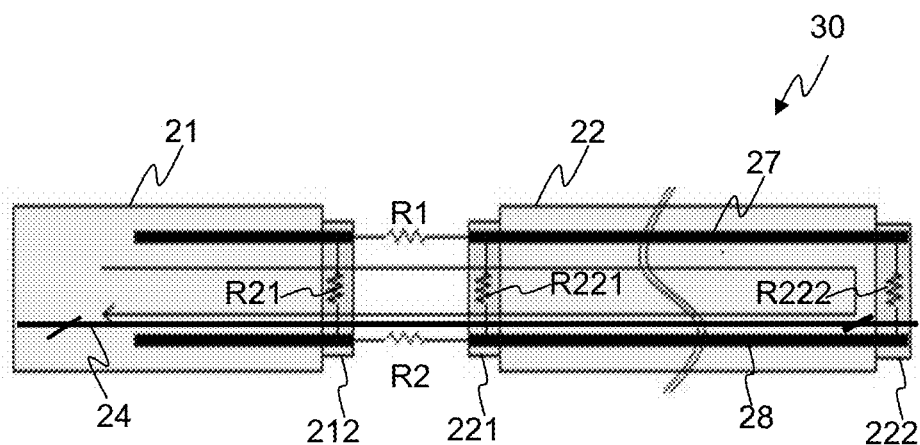
Figure 4A:
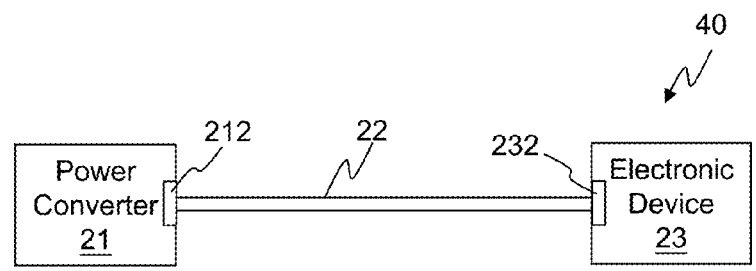
FIGS. 4A-4B show a block diagram of a power supply system according to a third embodiment of the present invention.
Figure 4B:
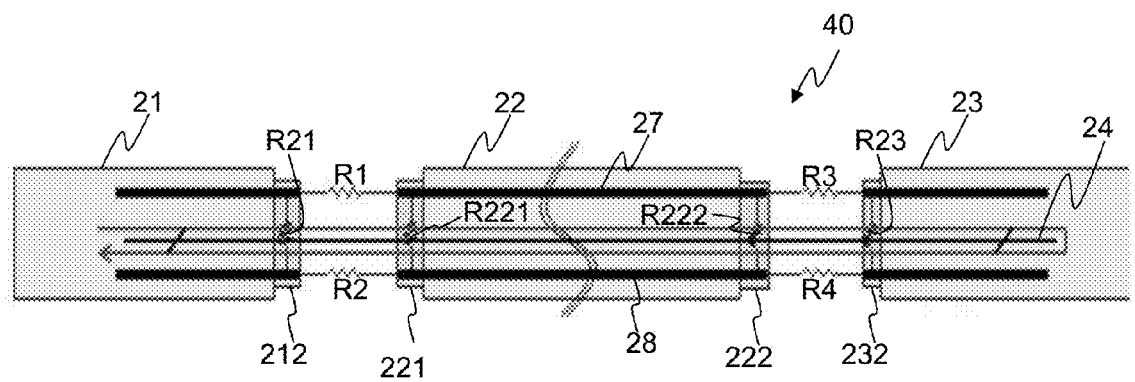

Please refer to FIGS. 2A-2C, FIGS. 3A-3B and FIGS. 4A-4B. FIG. 2A shows a block diagram of a power supply system according to a first embodiment of the present invention. FIG. 2B shows a circuit diagram of FIG. 2A. FIG. 2C shows an embodiment of a power converter. In FIGS. 2A-2C, the power converter is not coupled to a cable. FIG. 3A shows a block diagram of a power supply system according to a second embodiment of the present invention. FIG. 3B shows a circuit diagram of FIG. 3A. In FIGS. 3A-3B, the power converter is coupled to a cable. FIG. 4A shows a block diagram of a power supply system according to a third embodiment of the present invention. FIG. 4B shows a circuit diagram of FIG. 4A. In FIGS. 4A-4B, the power converter and the electronic device are coupled to each other through a cable.

In one embodiment, the power converter 21 has not yet been connected to any other device or component (as shown by the power supply system 20 in FIG. 2B). As shown in FIG. 2B, the power converter 21 has one port 212. In another embodiment, the power converter 21 has already been connected to a cable 22 but has not yet been connected to an electronic device (as shown by the power supply system 30 in FIG. 3B). As shown in FIG. 3B, a port 212 of the power converter 21 is connected to a port 221 of the cable 22. In still another embodiment, the power converter 21, the cable 22 and the electronic device 23 have already been connected in serial (as shown by the power supply system 40 in FIG. 4B). A port 212 of the power converter 21 is connected to a port 221 of the cable 22, and a port 232 of the electronic device 23 is connected to a port 222 of the cable 22.

Please refer to FIG. 2C. The power converter 21 can be, for example but not limited to, an isolated type AC-DC converter. Note that the power converter 21 shown in FIG. 2C is for illustrative purpose only, but not for limiting the scope of the present invention. The power converter 21 can be any other type of power converter. In the isolated type AC-DC converter shown in FIG. 2C, the power converter 21 includes a transformer 213 having a primary side 213a and a secondary side 213b. The primary side 213a is coupled to a switch SW which is controlled by a switch control unit 214. The secondary side 213b is coupled to an output unit 210, which generates a feedback signal FB according to an output voltage Vout, and provides the feedback signal FB through a feedback circuit 215 (e.g., an opto-coupler circuit) to the switch control unit 214. In normal operation, the switch control unit 214 controls the switch SW according to the feedback signal FB, to convert an input voltage Vin to the output voltage Vout at the secondary side 213b. The output unit 210 includes a short circuit detection unit 211, to detect whether a short circuit or even a weakly short circuit occurs. The details for the short circuit detection unit 211 will be described later. The basics of an isolated type AC-DC converter are well known to those skilled in the art, so for the sake of simplicity, only the circuits relevant to the present invention are illustrated whereas other circuits irrelevant to the present invention are omitted.

Note that the power converter 21 is not limited to an isolated type AC-DC converter, yet it can also be another type of switching power converter such as a synchronous or asynchronous boost, buck, buck-boost or inverting power converter. Among these switching power converters (including the isolated type AC-DC converter), they all have a switch control unit, which controls at least one switch according to the feedback signal, to convert the input voltage to the output voltage. The present invention is applicable to anyone of these switching power converters. The short circuit detection unit can be located at any appropriate location within the switching power converter, which, when detecting that a short circuit or a weakly short circuit occurs, issues an error signal Error 1 to the switch control unit.

Please refer to FIGS. 3A-3B and FIGS. 4A-4B. Unlike the embodiment shown in FIGS. 2A-2C, the power converter 21 shown in FIGS. 3A-3B has already been connected to a cable 22. And, in embodiment shown in FIGS. 4A-4B, the power converter 21 is connected to the cable 22 and the cable 22 is connected to the electronic device 23. In the embodiment shown in FIGS. 4A-4B, in normal operation, the power lines 27 and 28 form a loop, so that power can be delivered to the electronic device 23. The cable 22 further includes a signal line 24, for data transmission between the power converter 21 and the electronic device 23. The signal line 24 can be, for example but not limited to, a differential signal line.

As shown in FIGS. 2B, 3B and 4B, when there is an unwanted material such as dust falling on or in the ports 212, 221, 222 and/or 232, a short-cut current path is formed between the power lines 17 and 18, but the electrical connection is weak, so there is not a huge amount of current flowing through this short-cut current path. Such "weakly short circuit" is illustrated by the resistors R21, R221, R222 and R23 in the figures. This abnormal condition leads to power loss, and if this abnormal condition is not well controlled, it can be very dangerous.

To overcome this drawback, the short circuit detection unit 211 of this embodiment can detect whether a short circuit abnormal condition occurs, so that necessary procedures can be taken as soon as possible.

Figure 5A:
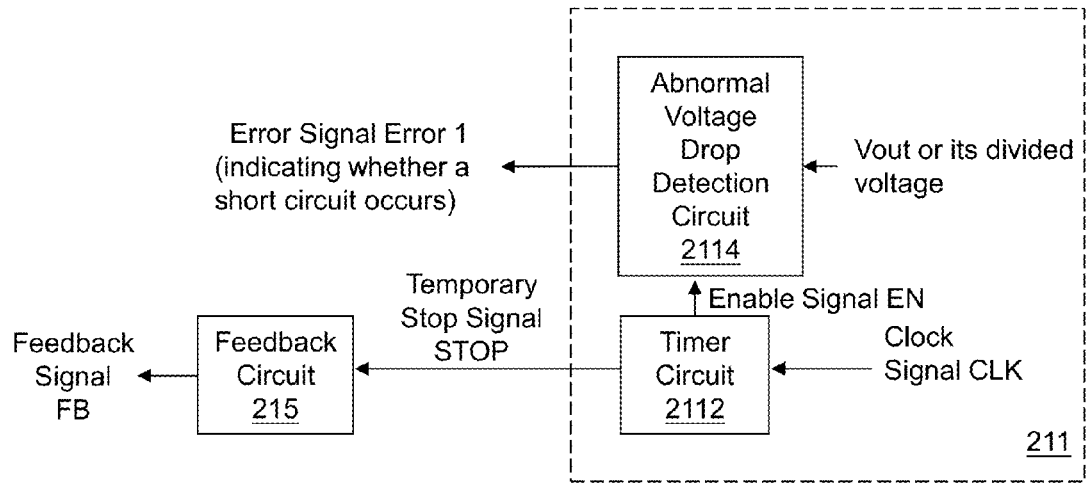
FIG. 5A shows an embodiment of a short circuit detection unit.
Figure 5B:
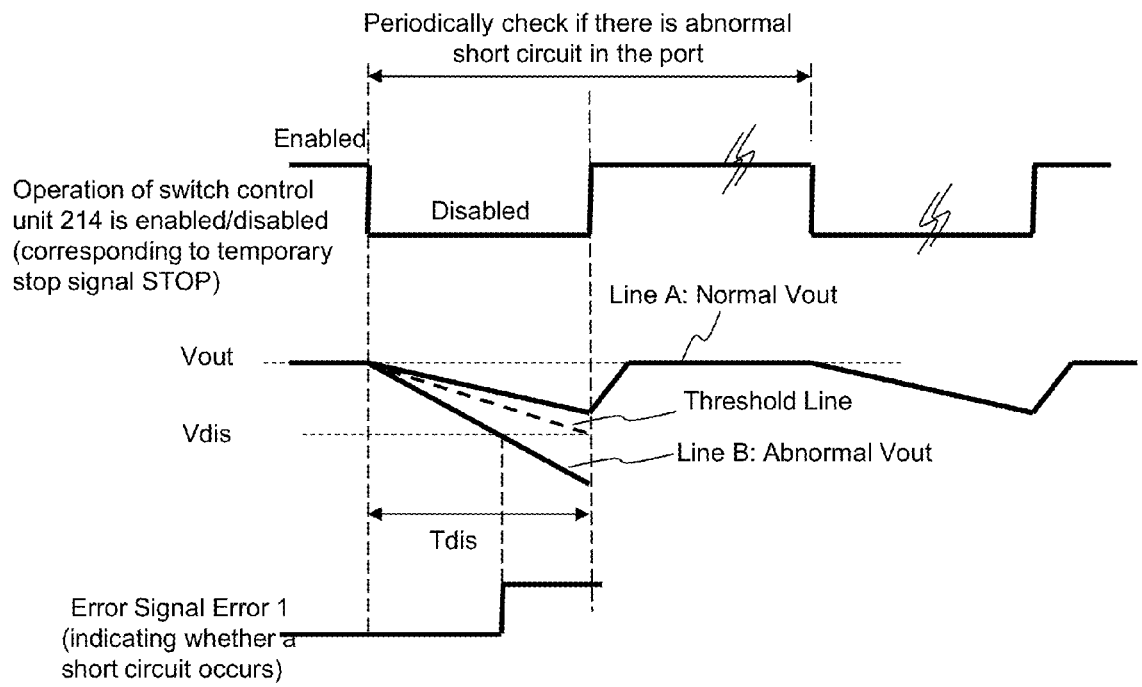
FIG. 5B explains how the present invention performs the short circuit detection.

FIGS. 5A-5B shows an embodiment of the short circuit detection unit 211. Regardless whether the power converter 21 is connected to the cable 22 and regardless whether the cable 22 is connected to the electronic device 23, this embodiment can be adopted to check whether a short circuit abnormal condition occurs.

Please refer to FIGS. 5A-5B. The short circuit detection unit 211 of this embodiment includes a timer circuit 2112 and an abnormal voltage drop detection circuit 2114. The timer circuit 2112 counts time according to a clock signal CLK, to generate a temporary stop signal STOP which lasts for a period of time, i.e., the disable time period Tdis. ("To generate a temporary stop signal STOP" means to set the level of the temporary stop signal STOP to a predefined level, such as a high level or a low level of a digital signal). In this embodiment, the timer circuit 2112 periodically generates the temporary stop signal STOP. In other embodiments, the temporary stop signal STOP can be triggered and generated by other mechanisms (which will be described later). The clock signal CLK can be obtained from a clock signal inside the power converter 21; or, it can be obtained from an oscillator (not shown). When the temporary stop signal STOP is generated, the switch control unit 214 is disabled, so that the power converter 21 does not operate to convert the input voltage Vin to the output voltage Vout. The switch control unit 214 can be disabled by various ways, and the present invention is not limited to anyone of these ways. This embodiment shows one example: if the power converter 21 is isolated type AC-DC converter, it usually uses a feedback circuit 215 (e.g., an opto-coupler circuit) to transmit the feedback signal FB. The temporary stop signal STOP can be used to disable the feedback circuit 215. Because the isolated type AC-DC converter adopts a negative feedback mechanism, when the feedback circuit 215 does not operate, the switch control unit 214 will judge that the output voltage Vout is sufficient, so as not to proceed the operation to convert the input voltage Vin to the output voltage Vout, and this is equivalent to disabling the switch control unit 214. If the power converter 21 is another type of switching power converter, the switch control unit 214 can be disabled by any suitable way. The disable time period Tdis in which the temporary stop signal STOP disables the switch control unit 214 is shown in FIG. 5B.

While the temporary stop signal STOP disables the switch control unit 214, the timer circuit 2112 enables the abnormal voltage drop detection circuit 2114 by an enable signal EN. Therefore, the temporary stop signal STOP and the enable signal EN can be the same signal, or one being an inverted signal of the other. Certainly, in another embodiment, the temporary stop signal STOP and the enable signal EN can be two different signals, and the enable signal EN can start slightly later than the temporary stop signal STOP. Being enabled, the abnormal voltage drop detection circuit 2114 determines whether the output voltage Vout drops abnormally according to a decreasing speed of the output voltage Vout.

Please refer to FIG. 5B. During the disable time period Tdis, the power converter 21 does not operate to convert the input voltage Vin to the output voltage Vout. However, because there is a normal depletion of charges, the output voltage Vout will drop slowly. Hence, a threshold line can be set, based upon a reasonable decreasing speed of the output voltage Vout. If the decreasing speed of the output voltage Vout is faster and than the threshold line, it can be judged that an undesirable short circuit occurs.

Figure 6A:
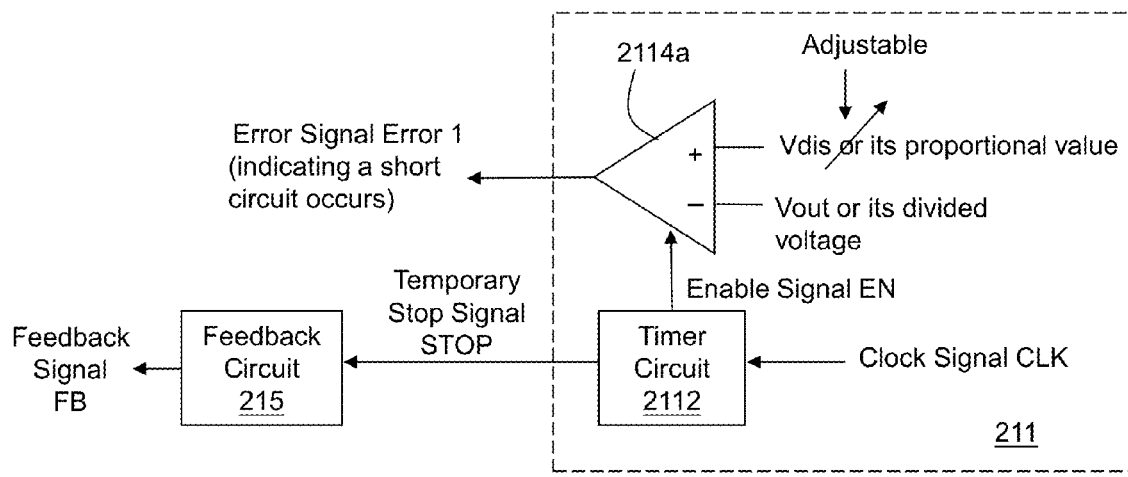
FIG. 6A shows another embodiment of a short circuit detection unit.

Please refer to FIG. 6A in conjugation with FIG. 5B. In one embodiment, the abnormal voltage drop detection circuit 2114 includes a voltage comparison circuit 2114a, which compare the output voltage Vout with a reference voltage Vdis (in circuit design, an equivalent approach is to compare a divided voltage of the output voltage Vout with a proportional value of the reference voltage Vdis). In normal operation, the output voltage Vout will not drop below the reference voltage Vdis during the disable time period Tdis (as shown by the line A in FIG. 5B). Nevertheless, if the output voltage Vout is below the reference voltage Vdis during the disable time period Tdis (as shown by the line B in FIG. 5B), it indicates that, in addition to the normal depletion of the charges, there must be a short circuit. Under such circumstance, the voltage comparison circuit 2114a outputs the error signal Error 1 to reflect that a short circuit has occurred.

The abnormal voltage drop detection circuit 2114 can detect and calculate the decreasing speed of the output voltage Vout by any other way instead of adopting the voltage comparison circuit. For example, the abnormal voltage drop detection circuit 2114 can detect the output voltage Vout at two different time points, to obtain a dropping slope of the output voltage Vout (i.e., the slope of line A or line B); the dropping slope can be compared with the slope of the threshold line. Adopting the voltage comparison circuit to detect and calculate the decreasing speed of the output voltage Vout is a relatively simpler approach; however, any other approach to detect and calculate the decreasing speed of the output voltage Vout is still within the scope of the present invention.

As compared to the case wherein the power converter 21 is not connected to the electronic device 23 through the cable 22, in the case wherein the power converter 21 is connected to the electronic device 23 through the cable 22, the normal depletion of charges is relatively higher. Under such circumstance, in one embodiment, the reference voltage Vdis can be set to a relatively lower level. There are many ways to adjust the setting of the reference voltage Vdis, and the present invention is not limited to anyone of these ways. For example, when the power converter 21 is connected to the electronic device 23 through the cable 22, usually, the electronic device 23 will transmit signals through the signal line 24 to confirm the connection status, or to communicate for other purposes. Therefore, for example, the short circuit detection unit 211 can set the reference voltage Vdis to a relatively lower level when the signal line 24 transmits a signal verifying that the power converter 21 is connected to the electronic device 23 through the cable 22. On the contrary, when the signal line 24 does not transmit a signal verifying that the power converter 21 is connected to the electronic device 23 through the cable 22, the short circuit detection unit 211 can set the reference voltage Vdis to a relatively higher level. However, that the reference voltage Vdis is adjustable is only preferred but not necessary. Certainly, it is also practicable and within the scope of the present invention that the reference voltage Vdis is a constant.

Besides adjusting the reference voltage Vdis according to whether or not the electronic device 23 is connected to the power converter 21 through the cable 22, in another embodiment of the present invention, the duration of the disable time period Tdis can be adjusted. For example, in the case wherein the power converter 21 is connected to the electronic device 23 through the cable 22, the normal depletion of charges is relatively higher. Under such circumstance, the duration of the disable time period Tdis can be shortened, for example by changing the frequency of the clock signal CLK or the time count of the timer circuit.

Figure 6B:
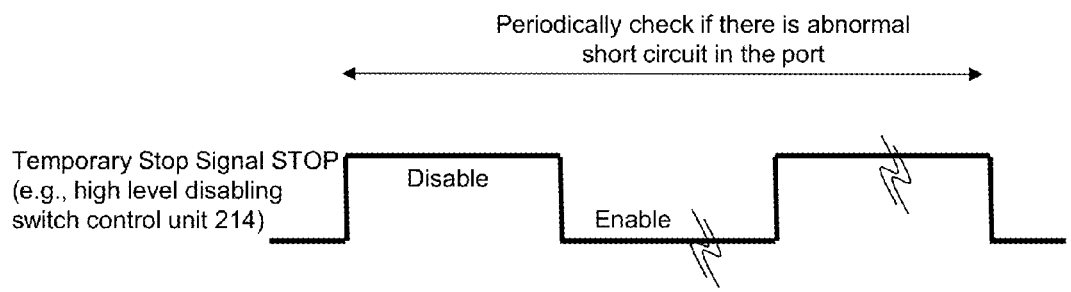
FIGS. 6B-6C show two embodiments as to how the present invention generates a temporary stop signal.
Figure 6C:
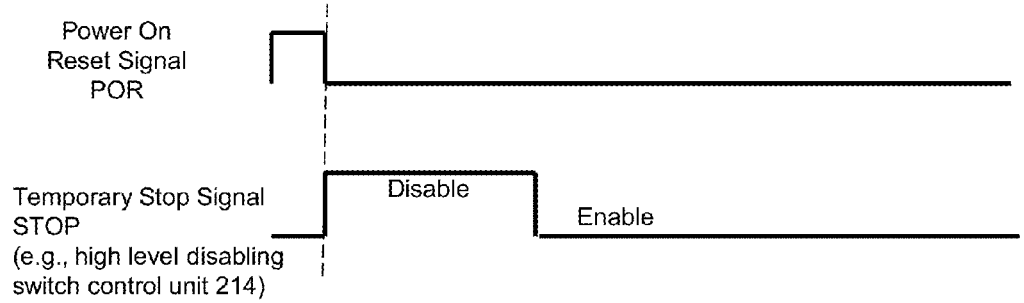

In the embodiment shown in FIG. 6B, the temporary stop signal STOP is periodically generated, which is only one example. In other embodiments, the temporary stop signal STOP can be generated during (or immediately after) a start-up operation or a power-on-reset operation, or, the temporary stop signal STOP can be generated irregularly during normal operation. For example, please refer to FIG. 6C, typically, a Power On Reset (POR) signal is generated during a start-up operation or a power-on-reset operation, and the temporary stop signal STOP can be generated according to this POR signal. For another example, the temporary stop signal STOP can be generated can be set randomly. Thus, the present invention can generate the temporary stop signal STOP by one or a combination of two or more of the following approaches: generating the temporary stop signal STOP during (or immediately after) a start-up operation; generating the temporary stop signal STOP during (or immediately after) a power-on-reset operation; generating the temporary stop signal STOP periodically; or generating the temporary stop signal STOP irregularly (for example, the temporary stop signal STOP can be generated not only periodically but also irregularly).

Figure 7A:
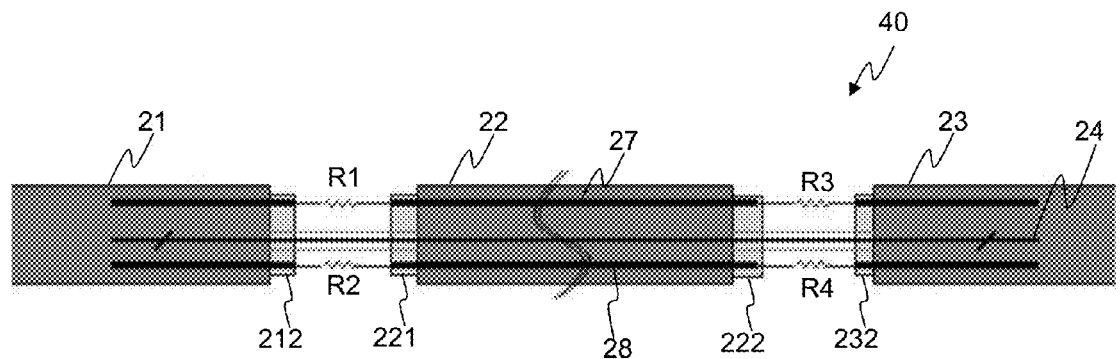
FIGS. 7A-7C explain an embodiment as to how the present invention performs the bad connection detection.
Figure 7B:
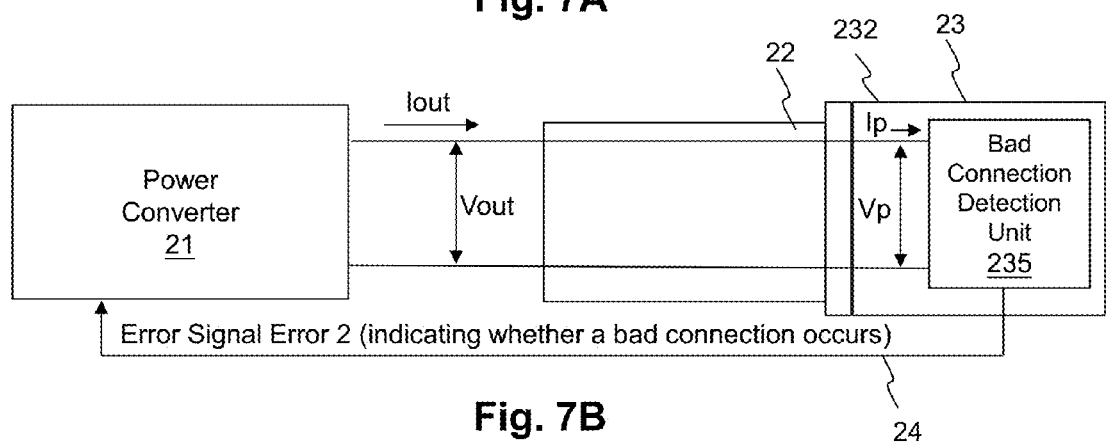
Figure 7C:
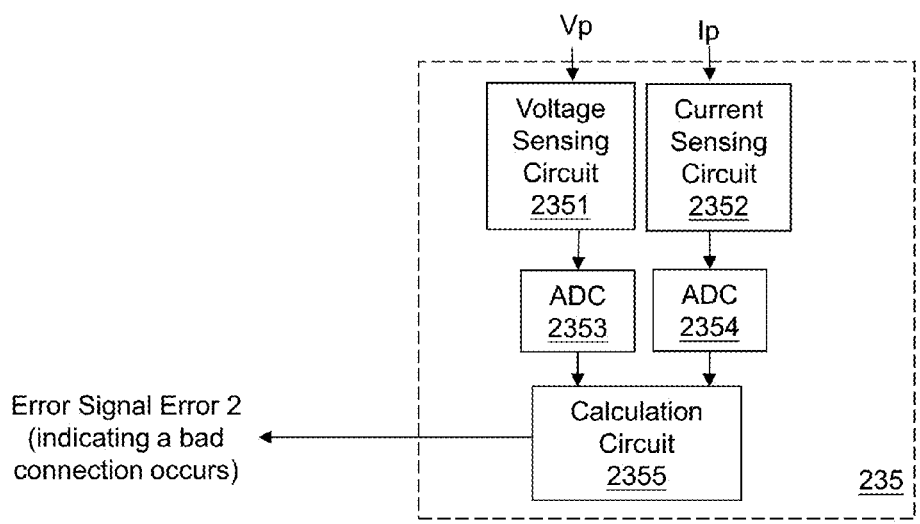

FIGS. 7A-7C show another embodiment of the present invention, which show the bad connection detection unit and explain how the present invention performs a bad connection detection. The bad connection needs to be detected only when the power converter 21 is connected to the cable 22 and the cable 22 is connected to the electronic device 23, so this is what is shown in FIGS. 7A-7C.

Please refer to FIG. 7B. Although what the power converter 21 provides is the output voltage Vout, the voltage actually received by the electronic device 23 is the actual voltage Vp because of the bad connection (which is expressed by resistors R1, R2, R3 and R4). Likewise, although what the power converter 21 provides is the output current Iout, the current actually received by the electronic device 23 is the actual current Ip because of the bad connection. The bad connection detection unit 235 is provided to detect whether a bad connection occurs.

As shown in FIGS. 7B-7C, the bad connection detection unit 235 of this embodiment can be, for example but not limited to, located inside the electronic device 23. The bad connection detection unit 235 includes a voltage sensing circuit 2351, a current sensing circuit 2352, an analog-to-digital converter (ADC) 2353, an analog-to-digital converter (ADC) 2354, and a calculation circuit 2355. The voltage sensing circuit 2351 senses the actual voltage Vp, which is then converted to a digital signal by the ADC 2353. The current sensing circuit 2352 senses the actual current Ip, which is then converted to a digital signal by the ADC 2354. The calculation circuit 2355 performs calculation according to the outputs from the ADC 2353 and ADC 2354. In one embodiment, information of the target level of the output voltage Vout and the target level of the output current Iout is given by the electronic device 23, via the signal line 24 in the cable 22, to the power converter 21. Under such circumstance, because the electronic device 23 has already known the target levels of the output voltage Vout and the output current Iout, these levels can be pre-stored in the calculation circuit 2355. The calculation circuit 2355 can compare the outputs from the ADC 2353 and the ADC 2354 with the pre-stored target levels of the output voltage Vout and the output current Iout. When a difference between the target level of the output voltage Vout and the actual voltage Vp is too large, and/or when a difference between the target level of the output current Iout and the actual current Ip is too large (i.e., the difference exceeds a predetermined threshold difference), the calculation circuit 2355 will issue an error signal Error 2 to indicate that a "bad connection" occurs. Such error signal Error 2 can be transmitted via, for example, the signal line 24. Certainly, in other embodiments, the error signal Error 2 can be transmitted via other wirings (under such circumstance, the cable 22 needs to include such wirings). Furthermore, to avoid misjudging the occurrence of a bad connection when the circuit just starts up or when the electronic device 23 is in heavily loaded condition, the determination of "bad connection" can be conducted when the circuit is stable.

Figure 7D:
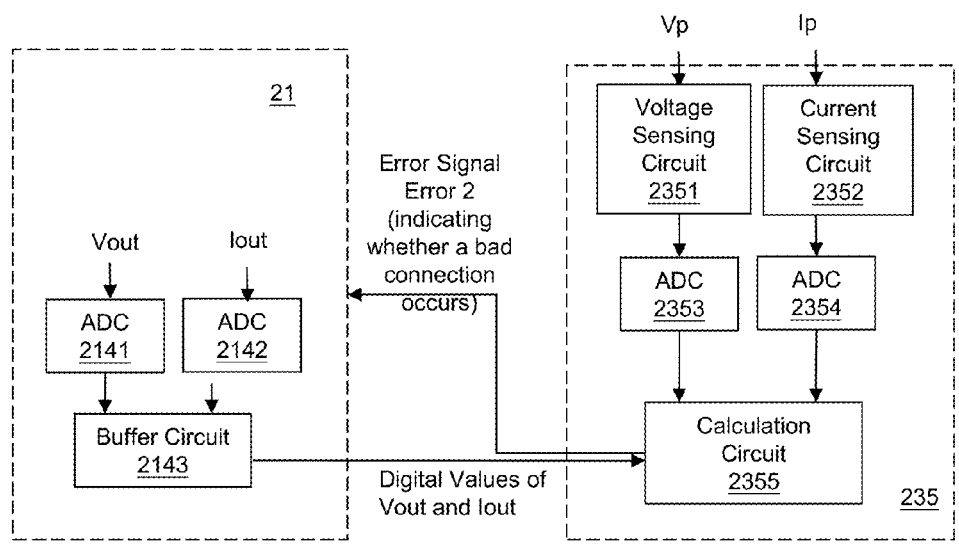
FIGS. 7D-7E show two embodiments as to how the present invention performs the bad connection detection.

FIG. 7D explains another embodiment as to how the present invention performs a bad connection detection. In this embodiment, an ADC 2141 and an ADC 2142 are included in the power converter 21 (e.g., when the power converter 21 is an isolated type AC-DC converter, the ADC 2141 and the ADC 2142 can be located inside the output unit 210; or, when the power converter 21 is another type of power converter, the ADC 2141 and the ADC 2142 can be located inside the switch control unit 214). The ADC 2141 and the ADC 2142 convert the output voltage Vout and the output current Iout into digital signals, respectively. The converted digital values are outputted to the calculation circuit 2355 through a buffer circuit 2143. The calculation circuit 2355 compares the outputs from the ADC 2353 and the ADC 2354 with the information of the output voltage Vout and the output current Iout outputted from the buffer circuit 2143. When a difference between the target level of the output voltage Vout and the actual voltage Vp is too large, and/or when a difference between the target level of the output current Iout and the actual current Ip is too large (i.e., the difference exceeds a predetermined threshold difference), the calculation circuit 2355 will issue an error signal Error 2 to indicate that a "bad connection" occurs. Because the signal line 24 can transmit signals bi-directionally, the information of the output voltage Vout, the output current Iout and the error signal Error 2 can all be transmitted via the signal line 24.

Figure 7E:
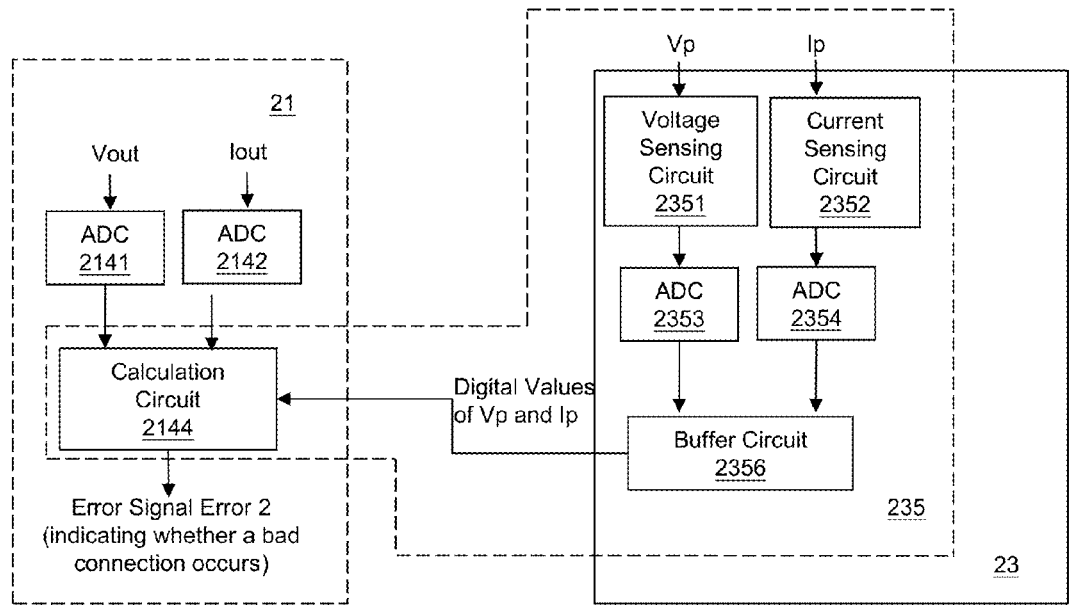

FIG. 7E explains another embodiment as to how the present invention performs a bad connection detection. In this embodiment, a calculation circuit 2144 is included in the power converter 21 (e.g., when the power converter 21 is an isolated type AC-DC converter, the calculation circuit 2144 can be located inside the output unit 210; or, when the power converter 21 is another type of power converter, the calculation circuit 2144 can be located inside the switch control unit 214). And, in this embodiment, the bad connection detection circuit 235 further includes a buffer circuit 2356 in the electronic device 23. In other words, the bad connection detection circuit 235 can be regarded as having two separate parts, located inside the power converter 21 and inside the electronic device 23, respectively. The bad connection detection circuit 235 outputs digital signals converted from the actual voltage Vp and the actual current Ip, which are sent to the calculation circuit 2144 of the switch control unit 214. The calculation circuit 2144 compares the converted digital signals of the actual voltage Vp and the actual current Ip with the converted digital values of the output voltage Vout and the output current Iout outputted from the ADC 2141 and the ADC 2142, respectively. When a difference between the voltages and/or a difference between the currents is too large (i.e., the difference exceeds a predetermined threshold difference), the calculation circuit 2144 will issue an error signal Error 2 to indicate that a "bad connection" occurs.

When an abnormal condition such as a short circuit or a bad connection is detected and the error signal Error 1 or the error signal Error 2 is generated, the generated error signal Error 1 or Error 2 can be used in various ways. For example, the error signal Error 1 or Error 2 can function as an alarm signal to the user (e.g., the error signal Error 1 or Error2 can light up an LED lamp, or trigger a buzzer to issue an alert). Or, the error signal Error 1 or Error2 can maintain the temporary stop signal STOP at the predefined level. Or, the error signal Error 1 or Error2 can be used to directly disable the switch control unit 214. Or, the error signal Error 1 or Error2 can be used to turn off the power converter 21. Or, if the power converter 21 is an isolated type AC-DC converter, the error signal Error 1 or Error2 can be used to open the path by which the secondary side of the transformer provides the output voltage Vout. Or, the error signal Error 1 or Error2 is not used to turn off the power converter 21, but instead to limit the maximum of the output current of the power converter 21. Any or more of the above and other ways can be adopted, depending on practical needs.

In view of the above, the power supply system of the present invention can, on one hand, detect the abnormal short circuit through the short circuit detection unit 211 and can, on the other hand, detect the abnormal bad connection through the bad connection detection unit 235, so that power loss due to these abnormal conditions can be avoided to improve the power utilization efficiency and better protect the circuit.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the definition of the high level and the low level of a digital signal are interchangeable, with corresponding amendments of the circuits processing these signals. For another example, a device which does not substantially influence the primary function of a signal can be inserted between any two devices or circuits in the shown embodiments. For yet another example, the cable 22 and the power converter 21 can be integrated into a single device; or, the cable 22 and the electronic device can be integrated into a single device, and the spirit of the present invention can still be applied to such configurations. In view of the foregoing, the spirit of the present invention should cover all such and other modifications and variations, which should be interpreted to fall within the scope of the following claims and their equivalents.

What is claimed is:

1. A power converter for converting an input voltage to an output voltage, wherein the output voltage is to be supplied to an electronic device through a cable; the power converter comprising:
 a switch;
 a switch control unit for controlling the switch, to perform the conversion from the input voltage to the output voltage; and
 a short circuit detection unit, including:
  a timer circuit for generating a temporary stop signal, to temporarily disable the switch control unit for a disable time period; and
  an abnormal voltage drop detection circuit for determining whether or not a short circuit occurs during the disable time period in which the switch control unit has been disabled according to a decreasing speed of the output voltage; wherein, after the switch control unit has been disabled, the abnormal voltage drop detection circuit subsequently determines whether the output voltage drops abnormally according to the decreasing speed of the output voltage, so as to subsequently determine whether or not the short circuit occurs.

2. The power converter of claim 1, wherein the abnormal voltage drop detection circuit includes:
 a voltage comparison circuit for determining whether or not the short circuit occurs according to a comparison result between the output voltage and a reference voltage.

3. The power converter of claim 2, wherein the reference voltage is adjustable.

4. The power converter of claim 3, wherein:
 when the power converter is coupled to the electronic device through the cable, the reference voltage is set to a relatively lower level; and
 when the power converter is not coupled to the electronic device through the cable, the reference voltage is set to a relatively higher level.

5. The power converter of claim 1, wherein the power converter includes an isolated type AC-DC converter, and the isolated type AC-DC converter transmits a feedback signal related to the output voltage to the switch control unit via a feedback circuit, wherein the temporary stop signal disables the switch control unit by turning off the feedback circuit.

6. The power converter of claim 1, wherein the timer circuit generates the temporary stop signal by one or a combination of two or more of the following approaches: generating the temporary stop signal STOP during or immediately after a start-up operation; generating the temporary stop signal STOP during or immediately after a power-on-reset operation; generating the temporary stop signal STOP periodically; or generating the temporary stop signal STOP irregularly.

7. A short circuit detection method of a power supply system, wherein the power supply system includes a power converter for converting an input voltage to an output voltage to be supplied to an electronic device through a cable; the short circuit detection method of the power supply system comprising the steps of:
 stopping converting the input voltage to the output voltage for a disable time period in which a switch control unit of the power converter has been disabled;
 after the switch control unit has been disabled, subsequently determining whether the output voltage drops abnormally according to a decreasing speed of the output voltage, so as to subsequently determine whether or not a short circuit occurs.

8. The short circuit detection method of the power supply system of claim 7, wherein the step of determining whether or not the short circuit occurs according to the decreasing speed of the output voltage includes:
 comparing the output voltage with a reference voltage.

9. The short circuit detection method of the power supply system of claim 8, wherein the reference voltage is adjustable.

10. The short circuit detection method of the power supply system of claim 9, wherein:
 when the power converter is coupled to the electronic device through the cable, the reference voltage is set to a relatively lower level; and
 when the power converter is not coupled to the electronic device through the cable, the reference voltage is set to a relatively higher level.

11. The short circuit detection method of the power supply system of claim 7, wherein the power converter includes an isolated type AC-DC converter, and the isolated type AC-DC converter transmits a feedback signal related to the output voltage to a switch control unit via a feedback circuit, wherein the step of stopping converting the input voltage to the output voltage for a disable time period includes: disabling the switch control unit by turning off the feedback circuit.

12. The short circuit detection method of the power supply system of claim 7, wherein the step of stopping converting the input voltage to the output voltage for a disable time period includes: starting the disable time period during or immediately after a start-up operation; starting the disable time period during or immediately after a power-on-reset operation; starting the disable time period periodically; or starting the disable time period irregularly; or a combination of two or more of the above.

* * * * *